United States Patent
Liu et al.

(10) Patent No.: US 12,102,106 B2
(45) Date of Patent: Oct. 1, 2024

(54) METHOD FOR PREPARING MODIFIED STARCH, LIPOSOME AND METHOD FOR PREPARING LIPOSOME

(71) Applicants: Xiamen Kingdomway Biotech. Co., Ltd., Fujian (CN); Xiamen Kingdomway Group Company, Fujian (CN)

(72) Inventors: Jinhong Liu, Fujian (CN); Xuerui Wang, Fujian (CN); Murong Lin, Fujian (CN); Wenji Wang, Fujian (CN)

(73) Assignees: Xiamen Kingdomway Biotech. Co., Ltd., Fujian (CN); Xiamen Kingdomway Group Company, Fujian (CN)

( * ) Notice: Subject to any disclaimer, the term of this patent is extended or adjusted under 35 U.S.C. 154(b) by 41 days.

(21) Appl. No.: 17/743,654

(22) Filed: May 13, 2022

(65) Prior Publication Data

US 2023/0200419 A1    Jun. 29, 2023

(30) Foreign Application Priority Data

Dec. 23, 2021    (CN) .......................... 202111589912.3

(51) Int. Cl.
```
A23L 29/219    (2016.01)
A23L 29/10     (2016.01)
A23L 33/15     (2016.01)
C08B 31/04     (2006.01)
```

(52) U.S. Cl.
CPC .............. *A23L 29/219* (2016.08); *A23L 29/10* (2016.08); *A23L 33/15* (2016.08); *C08B 31/04* (2013.01)

(58) Field of Classification Search
CPC ........ A23L 29/219; A23L 29/10; A23L 33/15; C08B 31/04
See application file for complete search history.

(56) References Cited

U.S. PATENT DOCUMENTS 8,216,628 B2    7/2012   Koxholt et al.

FOREIGN PATENT DOCUMENTS

| CN | 1414023 A    | 4/2003 |
| CN | 101703549 A  | 5/2010 |
| CN | 113331423 A  | 9/2021 |

OTHER PUBLICATIONS

Ivanovic et al. (Starch/Starke, 68,621-833).*
Wang et al. (food engineering Reviews (2021) 13:570-591 First published on line Nov. 23; 2020).*
Fan et al. (carbohydrate Polymers 241(2020)116350).*
Ivanovic et al. (Starch/Starke, 68,621-833); 2016.*
English language abstract and original Chinese language document of Ju, Quan-liang et al., High-Charged-Ion-Octenyl Succinic Anhydride Modified Starch as Microcapsule Shell Material, Science and Technology of Food Industry, vol. 40, No. 1, 2019, 5 pages.
English language abstract provided by CCPIT Patent & Trademark Law Office on May 19, 2022 and original Chinese language document of Xia, Fei, "Preparation of Nutrient Proliposomes Based on Solution Enhanced Dispersion by Supercritical Fluids Technology", School of Chemistry and Chemical Engineering, Jan. 4, 2012, 146 pages.
Bai, Jun et al., "Research of the Supercritical CO2 Treatment on Cassava Starch and the Synthesis of Octenyl Succinate Anhydrate Modified Starch", 73 pages, Jun. 24, 2016.
Yang, Weiling et al., "Modern Research on Common Medicinal Plants of Li Nationality in Hainan", 18 pages, Jan. 1, 2018.
English language abstract for CN 1414023 A extracted from espacenet.com database on Nov. 1, 2022, 1 page.
English language abstract and machine-assisted English translation for CN 101703549 A extracted from espacenet. com database on Nov. 1, 2022, 18 pages.
English language abstract and machine-assisted English translation for CN 113331423 A extracted from espacenet. com database on Nov. 1, 2022, 11 pages.
English language abstract (2 pages) provided by CCPIT Patent & Trademark Law Office on Nov. 1, 2022 and original Chinese language document of Bai, Jun et al., "Research of the Supercritical CO2 Treatment on Cassava Starch and the Synthesis of Octenyl Succinate Anhydrate Modified Starch", Jun. 24, 2016, 73 pages.
Matsubara, Masahiro et al., "Enhancing Resistant Starch Content in Brown Rice Using Supercritical Carbon Dioxide Processing", Journal of Food Process Engineering, Nov. 14, 2020, 8 pages.
Machine-assisted English language abstract (1 page) and original Chinese language document of Yang, Weiling et al., "Modern Research on Common Medicinal Plants of Li Nationality in Hainan", Jan. 1, 2018, 19 pages.

* cited by examiner

*Primary Examiner* — Shirley V Gembeh
(74) *Attorney, Agent, or Firm* — Howard & Howard Attorneys PLLC

(57) ABSTRACT

The invention pertains to the field of food or medicine, and relates to a method for preparing modified starch, a liposome and a method for preparing liposome. Specifically, the method for preparing modified starch, comprises: (1) in a supercritical carbon dioxide medium, starch is used as raw material, ethanol is used as an entrainer, and the reaction is carried out under supercritical $CO_2$ conditions to obtain a pretreated product; (2) separating and purifying the pretreated product of step (1); (3) using the pretreated product obtained in step (2) to prepare modified starch; and (4) separating and purifying the modified starch prepared in step (3). The liposome prepared from the modified starch of the present invention has good stability, encapsulation rate and bioavailability.

15 Claims, No Drawings

METHOD FOR PREPARING MODIFIED STARCH, LIPOSOME AND METHOD FOR PREPARING LIPOSOME

CROSS-REFERENCE TO RELATED APPLICATIONS

This application claims priority pursuant to 35 U.S.C. 119(a) to Chinese Patent Application No. 202111589912.3 filed Dec. 23, 2021, which application is incorporated herein by reference in its entirety.

TECHNICAL FIELD

The invention pertains to the field of food or medicine, and relates to a method for preparing modified starch, a liposome and a method for preparing liposome. The present invention also relates to a modified starch prepared by the method for preparing modified starch.

BACKGROUND

With people's higher demand for health, more and more people maintain their health by supplementing nutrients daily, in which coenzyme Q10, vitamin A, vitamin D3, polyunsaturated fatty acids, carotenoids and so on are the most widely used varieties. The above nutrients are all fat-soluble. It is all known that fat-soluble nutrients are insoluble in water but soluble in fat, and their absorption needs to rely on bile emulsification, and the absorption process is affected by fat content, bile volume and hepatobiliary function, so that the absorption rate is low and unstable and the bioavailability is low.

Therefore, how to improve the bioavailability of fat-soluble nutrients has become a key technical issue in their research and development as well as production process.

The preparation of fat-soluble nutrients into liposomes is one of the effective methods to improve bioavailability. Traditional liposomes generally consist of only (neutral or inert) phospholipids and/or cholesterol, and have relatively short emocircular time, resulting in insignificant improvements in the bioavailability of fat-soluble nutrients in the final product. To overcome this problem, long-circulating liposomes (also known as sterically stabilized liposomes) have been developed, which are coated with a polymer coating to achieve long-term circulation in the body. Currently, supercritical fluids are used for the encapsulation of sensitive components such as fat-soluble nutrients, and chemically inert $CO_2$ is used as a solvent, so that solvent post-treatment is not necessary. Liposome supercritical fluid technology is a new type of ultrafine particle preparation and coating technology. In recent years, it has been extended to the field of drug preparation such as microcapsules and microspheres to improve its bioavailability. In addition, the liposomes prepared according to the traditional method have low embedding rate, easy aggregation and poor stability.

Starch calcium octenyl succinate has a molecular formula of: $C_{18}H_{28}O_3(C_6H_{10}O_5)_n$Ca. Starch octenyl succinates include monovalent ionic starch octenyl succinates and high-valent ionic starch octenyl succinates (barium type, calcium type, ferric type, aluminum type). When high-valent ionic starch octenyl succinates are used as the wall materials of microcapsules, the viscosity of emulsion is decreased with the increase of ionic valence, and the embedding rate of core material is proportional to the ionic valence. The special molecular structure of starch calcium octenyl succinate makes its emulsion stability higher than that of starch sodium octenyl succinate, coupled with the properties of high concentration and low viscosity, when it is used to prepare microcapsule products, its performances such as drying speed, oil-embedding rate, shelf stability, dispersing and dissolving ability of powder in water, free fluidity and water repellency are all superior to those of the traditionally prepared starch sodium octenyl succinate wall material [Ju Quanliang, Bai Jun, Xie Xinling, Zhang Youquan, Shen Junli, High-valent ionic starch octenyl succinate as microcapsule wall material, [J] Food Industry Science and Technology, 2019, (1)].

At present, the main preparation processes of modified starch include wet method (water-phase method), dry method and organic solvent method, microwave method, extrusion method, enzymatic method, etc. Comparing these methods, in the water-phase method, since the acid anhydride is insoluble in water, the esterification reaction is an interfacial reaction, the reaction time is long, the production efficiency is low, and the amount of waste water is large; the dry method has a high reaction temperature, and the local reaction is violent and uneven; the reaction medium in the organic phase method, such as benzene, pyridine and other toxic solvents, will cause environmental pollution, the waste liquid treatment is difficult, the reaction degree of the microwave method is not easy to control, and the technology in practical application is immature.

Therefore, there is still a need to develop a safe and efficient method for preparing modified starch and a method for preparing liposomes.

SUMMARY

The inventors of the present invention have obtained a method for preparing modified starch through in-depth research and creative work. The inventors have surprisingly found that a modified starch such as starch calcium octenyl succinate prepared by this method has low viscosity, high emulsifying and dispersing properties. The inventors have also surprisingly found that the esterification of modified starch under supercritical $CO_2$ can further improve the degree of esterification and shorten the reaction time. The present invention is thus provided as follows:

One aspect of the present invention relates to a method for preparing modified starch, comprising the steps of:
(1) in a supercritical carbon dioxide medium, starch is used as raw material, ethanol is used as an entrainer, and the reaction is carried out under supercritical $CO_2$ conditions to obtain a pretreated product;
(2) separating and purifying the pretreated product of step (1);
(3) using the pretreated product obtained in step (2) to prepare modified starch;
separating and purifying the modified starch prepared in step (3).

The modified starch obtained in step (4) is the prepared modified starch.

In some embodiments of the present invention, in the method for preparing modified starch, the modified starch is one or more selected from the group consisting of starch calcium octenyl succinate, starch aluminum octenyl succinate, starch barium octenyl succinate and starch iron octenyl succinate.

In some embodiments of the present invention, in the method for preparing modified starch, in step (1), the starch is one or more selected from the group consisting of corn starch, tapioca starch and potato starch.

In some embodiments of the present invention, in the described method for preparing modified starch, In step (1), relative to the mass of starch, the amount of ethanol is 10%-30%; preferably 10%-20%, such as 10%, 11%, 12%, 13%, 14%, 15%, 16%, 17%, 18%, 19% or 20%; more preferably 12%-18% or 15%.

In some embodiments of the present invention, in the method for preparing modified starch, in step (1), the reaction time is 0.5-2 h; preferably 0.8-1.5 h, such as 0.8 h, 0.9 h, 1.0 h, 1.1 h, 1.2 h, 1.3 h, 1.4 h or 1.5 h; more preferably 0.8-1.2 h or 1 h.

In some embodiments of the present invention, in the method for preparing modified starch, in step (1), the supercritical $CO_2$ conditions are a pressure of 30-40 MPa and a temperature of 35° C.-50° C.

In some embodiments of the present invention, in the method for preparing modified starch, in step (1), the supercritical $CO_2$ conditions are a pressure of 30-40 MPa and a temperature of 35° C.-40° C.

In some embodiments of the present invention, in the method for preparing modified starch, in step (1), the supercritical $CO_2$ conditions are a pressure of 30-40 MPa and a temperature of 40° C.-50° C.

In some embodiments of the present invention, in the method for preparing modified starch, in step (1), the supercritical $CO_2$ conditions are a pressure of 30-40 MPa and a temperature of 35° C.

In some embodiments of the present invention, in the method for preparing modified starch, in step (1), the supercritical $CO_2$ conditions are a pressure of 30-40 MPa and a temperature of 50° C.

In some embodiments of the present invention, in the method for preparing modified starch, in step (1), the supercritical $CO_2$ conditions are a pressure of 30-40 MPa and a temperature of 40° C.

In some embodiments of the present invention, in the method for preparing modified starch, in step (1), the supercritical $CO_2$ conditions are a pressure of 30 MPa and a temperature of 40° C.

In some embodiments of the present invention, in the method for preparing modified starch, in step (1), the supercritical $CO_2$ conditions are a pressure of 30 MPa and a temperature of 35° C.-50° C.

In some embodiments of the present invention, in the method for preparing modified starch, in step (1), the supercritical $CO_2$ conditions are a pressure of 30 MPa and a temperature of 35° C.-40° C.

In some embodiments of the present invention, in the method for preparing modified starch, in step (1), the supercritical $CO_2$ conditions are a pressure of 30 MPa and a temperature of 40° C.-50° C.

In some embodiments of the present invention, in the method for preparing modified starch, in step (1), the supercritical $CO_2$ conditions are a pressure of 40 MPa and a temperature of 35° C.-50° C.

In some embodiments of the present invention, in the method for preparing modified starch, in step (1), the supercritical $CO_2$ conditions are a pressure of 40 MPa and a temperature of 35° C.-40° C.

In some embodiments of the present invention, in the method for preparing modified starch, in step (1), the supercritical $CO_2$ conditions are a pressure of 40 MPa and a temperature of 40° C.-50° C.

In some embodiments of the present invention, in the described method for preparing modified starch, in step (2), the product of step (1) is separated and purified by supercritical carbon dioxide extraction;

preferably, the pressure is 30-50 MPa, the temperature is 40° C.-50° C., and the flow rate of $CO_2$ is 10-25 L/h;

more preferably, the pressure is 40 MPa, the temperature is 45° C., and the flow rate of $CO_2$ is 15 L/h.

In some embodiments of the present invention, in the described method for preparing modified starch, in step (2), the pressure is 30-50 MPa, the temperature is 40° C.-50° C., and the flow rate of $CO_2$ is 15 L/h.

In some embodiments of the present invention, in the described method for preparing modified starch, in step (2), the pressure is 40 MPa, the temperature is 40° C.-50° C., and the flow rate of $CO_2$ is 10-25 L/h.

In some embodiments of the present invention, in the described method for preparing modified starch, in step (2), the pressure is 30-50 MPa, the temperature is 45° C., and the flow rate of $CO_2$ is 10-25 L/h.

In some embodiments of the present invention, in the described method for preparing modified starch, in step (2), the pressure is 30-50 MPa, the temperature is 45° C., and the flow rate of $CO_2$ is 15 L/h.

In some embodiments of the present invention, in the described method for preparing modified starch, in step (2), the pressure is 40 MPa, the temperature is 40° C.-50° C., and the flow rate of $CO_2$ is 15 L/h.

In some embodiments of the present invention, in the described method for preparing modified starch, in step (2), the pressure is 40 MPa, the temperature is 45° C., and the flow rate of $CO_2$ is 10-25 L/h.

In some embodiments of the present invention, in the method for preparing modified starch, in step (3), in a supercritical carbon dioxide medium, the product obtained in step (2) is used as a raw material and n-hexane is used as an entrainer, in the presence of a chemical modifier, a catalyst and an appropriate amount of water, the modified starch is prepared by a supercritical fluid reaction;

preferably, the supercritical reaction conditions are a pressure of 30-45 MPa and a temperature of 50° C.-60° C.; more preferably, a pressure of 40 MPa and a temperature of 50° C.;

preferably, relative to the mass of the product of step (2), the amount of n-hexane is 10%-25%; preferably 12%-20%, more preferably 15%-17%, such as 15%, 16% or 17%;

preferably, the chemical modifier is at least one selected from the group consisting of octenyl succinic anhydride and acetic anhydride; preferably, relative to the mass of the product in step (2), the amount of the chemical modifier is 2%-12%; preferably 4%-10%, more preferably 6%-8%, such as 6%, 7% or 8%;

preferably, the catalyst is at least one selected from the group consisting of $Ca(OH)_2$, $Al(OH)_3$, $Ba(OH)_2$ and $Fe(OH)_3$; preferably, relative to the mass of the product of step (2), the amount of catalyst is 2%-15%; preferably 3%-10%, more preferably 5%-6%, such as 5%, 5.5% or 6%;

preferably, relative to the mass of the product in step (2), the amount of water is 10%-70%; preferably 20%-60%, more preferably 30%-50%, such as 30%, 35%, 40%, 45% or 50%;

preferably, the reaction time is 1-5 hours, preferably 2-3 hours, such as 2 hours, 2.5 hours or 3 hours.

In some embodiments of the present invention, in the described method for preparing modified starch, in step (3), the supercritical reaction conditions are a pressure of 30-45 MPa and a temperature of 50° C.-60° C.; more preferably, a pressure of 40 MPa and a temperature of 50° C.

In some embodiments of the present invention, in the described method for preparing modified starch,
in step (3), the supercritical reaction conditions are a pressure of 30-45 MPa and a temperature of 50° C.

In some embodiments of the present invention, in the described method for preparing modified starch,
in step (3), the supercritical reaction conditions are a pressure of 30-45 MPa and a temperature of 60° C.

In some embodiments of the present invention, in the described method for preparing modified starch,
in step (3), the supercritical reaction conditions are a pressure of 40 MPa and a temperature of 50° C.-60° C.

In the present invention, an alkaline condition of $Ca(OH)_2$ is used as a catalyst, and calcium ion is replaced in this process, so it is also used as a reactant; the same way is also applied to $Al(OH)_3$, $Ba(OH)_2$ or $Fe(OH)_3$.

In some embodiments of the present invention, in the described method for preparing modified starch,
in step (4), the product of step (3) is separated and purified by supercritical carbon dioxide extraction;
preferably, the pressure is 40-50 MPa, the temperature is 55° C.-65° C., and the flow rate of $CO_2$ is 15-25 L/h;
more preferably, the pressure is 45 MPa, the temperature is 55° C., and the flow rate of $CO_2$ is 20 L/h.

In some embodiments of the present invention, in the described method for preparing modified starch,
in step (4), the pressure is 40-50 MPa, the temperature is 55° C.-65° C., and the flow rate of $CO_2$ is 20 L/h.

In some embodiments of the present invention, in the described method for preparing modified starch,
in step (4), the pressure is 45 MPa, the temperature is 55° C.-65° C., and the flow rate of $CO_2$ is 15-25 L/h.

In some embodiments of the present invention, in the described method for preparing modified starch,
in step (4), the pressure is 40-50 MPa, the temperature is 55° C., and the flow rate of $CO_2$ is 15-25 L/h.

In some embodiments of the present invention, in the described method for preparing modified starch,
in step (4), the pressure is 45 MPa, the temperature is 55° C., and the flow rate of $CO_2$ is 15-25 L/h.

In some embodiments of the present invention, in the described method for preparing modified starch,
in step (4), the pressure is 40-50 MPa, the temperature is 55° C., and the flow rate of $CO_2$ is 20 L/h.

In some embodiments of the present invention, in the described method for preparing modified starch,
in step (4), the pressure is 45 MPa, the temperature is 55° C.-65° C., and the flow rate of $CO_2$ is 20 L/h.

Another aspect of the present invention relates to a modified starch prepared by the method for preparing modified starch according to any one of the items of the present invention.

In some embodiments of the present invention, the modified starch is characterized by any one or more of the following items (1) to (3):
(1) the viscosity of the modified starch at 25° C. is less than 100 mPa·s, such as 60-95 mPa·s or 60-85 mPa·s;
(2) when the modified starch emulsifies liquid paraffin, the time required for the emulsion to separate 10 mL of solution is greater than or equal to 1100 s, such as 1100-1800 s, 1100-1700 s, 1100-1600 s, 1100-1600 s, 1100-1400 s, 1100-1300 s, 1100-1200 s, 1300-1800 s, 1400-1700 s, or 1500-1600 s;
(3) when 1 g of the modified starch is placed in 100 ml of water (25° C.), it is wetted and completely dissolved or dispersed in water, and the time required to form a uniform emulsion system is less than 100 s, such as 55-95 s, 65-95 s, 75-95 s, 85-95 s, 55-65 s, 55-75 s or 55-85 s.

Yet another aspect of the present invention relates to a liposome composition, which, by weight percentage, comprises: 5.5%-50.5% fat-soluble active ingredient, 0.01%-0.1% piperine, and optionally 0.02%-0.05% antioxidant, 5%-25% phospholipid, 8%-75% cholesterol and 10%-20% modified starch,
Wherein, the modified starch is the modified starch of the present invention.

In some embodiments of the present invention, in the liposome composition, by weight percentage, the content of the modified starch of the present invention is 10%, 11%, 12%, 13%, 14%, 15%, 16%, 17%, 18%, 19% or 20%.

In some embodiments of the present invention, in the liposome composition, by weight percentage, the content of the modified starch of the present invention is 12%-19%, 13%-18%, 14%-17%, 15%-17% or 16%-17%.

In some embodiments of the present invention, the liposome composition further comprises an appropriate amount of ethanol and/or water.

In some embodiments of the present invention, in the liposome composition:
the fat-soluble active ingredient is a fat-soluble drug or a fat-soluble nutrient;
preferably, the fat-soluble nutrient is at least one selected from the group consisting of coenzyme Q10, curcumin, fat-soluble vitamin, carotenoid, and polyunsaturated fatty acid;
preferably, the fat-soluble vitamin is selected from the group consisting of at least one of vitamin A, vitamin D, vitamin E, and vitamin K;
preferably, the carotenoid is selected from the group consisting of at least one of β-carotene, lutein, astaxanthin, lycopene and zeaxanthin;
preferably, the polyunsaturated fatty acid is derived from an animal or plant extraction oil, microbial fermentation source or chemical synthesis source, and the polyunsaturated fatty acid includes conjugated linoleic acid, arachidonic acid, linoleic acid, linolenic acid, EPA, DHA, DPA and mixture thereof;
preferably, the antioxidant is at least one selected from the group consisting of natural VE, rosemary extract, ascorbyl palmitate, tea polyphenol, butylated hydroxyanisole, dibutylhydroxytoluene, 2,6-di-tert-butyl-p-cresol;
preferably, the phospholipid is at least one selected from the group consisting of soybean lecithin, egg yolk lecithin, and hydrogenated lecithin.

In some embodiments of the present invention, the liposome composition is in the form of nanoliposome particles.

In some embodiments of the present invention, in the liposome composition, the number-average particle size of the nanoliposome particles is 90 nm-110 nm, preferably 95 nm-105 nm, 90 nm-100 nm or 95 nm-100 nm, more preferably 99 nm.

In some embodiments of the present invention, in the liposome composition, the particle size distribution of the nanoliposome particles ranges from 70 nm to 130 nm, preferably from 80 nm to 120 nm.

In some embodiments of the present invention, in the liposome composition, the encapsulation rate of the nanoliposome particles is greater than or equal to 90%, greater than or equal to 91%, or greater than or equal to 92%.

The liposome composition of the present invention is a water-dispersed product, and the nanoliposome is not easy to absorb moisture and stick to agglomerates under normal temperature environment. Compared with liposomes prepared by traditional methods, its encapsulation rate is higher, the particle size is smaller, and the particle size distribution range is narrower. Without being bound by theory, in terms of absorbability and bioavailability, because the liposome composition of the present invention has a smaller particle size, it is more able to adhere and contact in the gastrointestinal tract and be quickly absorbed, and such long-circulating liposome is more capable of maintaining longer blood circulation time and increasing in vivo exposure, thereby increasing its absorption and bioavailability.

Without being limited by theory, the liposome composition of the present invention adopts the preparation method of supercritical fluid technology, uses modified starch as stabilizer, dissolves liposome membrane material and active ingredient in supercritical $CO_2$/entrainer, and the solution is swollen and then dispersed in an aqueous medium containing modified starch as a stabilizer to form a liposome suspension, which provides an effective way for the self-assembly and stabilization of the active ingredient liposome in supercritical $CO_2$ medium. The liposome composition of the present invention is also added with an absorption enhancer (piperine) to increase the intestinal contact absorption so as to improve the bioavailability of the active ingredient, thereby enhancing the taking effect.

Another aspect of the present invention relates to a method for preparing the liposome composition described in any one of the items of the present invention, comprising the steps of:
1) preparing a fat-soluble nutrient-containing solution from phospholipid, cholesterol, fat-soluble nutrient, antioxidant, and absolute ethanol;
preferably, the fat-soluble nutrient-containing solution is obtained by mixing by ultrasound;
preferably, the mass fraction of the absolute ethanol is 10%-20%, preferably 12%-18% or 15% of the total weight of phospholipid, cholesterol, fat-soluble nutrient and antioxidant;
2) dissolving the modified starch of the present invention in water to prepare an aqueous solution;
preferably, the concentration of the modified starch is 50%-80%; more preferably 60%-70%;
preparing a supercritical emulsion from the fat-soluble nutrient-containing solution of step 1) and the aqueous phase solution of step 2); preferably, adding the fat-soluble nutrient-containing solution of step 1) under a certain flow rate into the aqueous phase solution of step 2) in a supercritical reactor, stirring at high speed in a supercritical carbon dioxide fluid to obtain a supercritical emulsion;
preferably, the reactor has a pressure of 10-35 MPa and a temperature of 50° C.-70° C.;
more preferably, the reactor has a pressure of 25-30 MPa and a temperature of 60° C.-68° C.;
preferably, the high-speed stirring is carried out for a time of 30-60 min, preferably 40-50 min;
4) supercritical spray drying the supercritical emulsion in step 3) to obtain a liposome composition;
preferably, the supercritical emulsion is subjected to the supercritical spray drying at a flow rate of 0.1-5 L/min.

Without being bound by theory, in the supercritical fluid, during the process of high-speed stirring liposome precursor solution of fat-soluble active ingredient such as coenzyme Q10 and starch aqueous solution, phospholipid molecules self-assemble in the aqueous solution to form liposomes, and starch is adsorbed and embedded at the same time on the surface of phospholipid molecules, reducing the collision between liposomes and stabilizing the liposomes; in addition, through the interaction between the phosphate groups on the outside of the liposomes and the hydroxyl groups in starch and the interaction between cholesterol in the liposome defect region and the hydrophobic region in the starch molecule, a very stable emulsion is thus formed, in which double-layer embedding can better protect the activity of lipid-soluble substances and improve their bioavailability.

Without being bound by theory, the preparation of liposomes in the prior art generally is a two-step method (for example, Xia Fei et al. used a supercritical $CO_2$-enhanced solution dispersion technology, and proposed a supercritical $CO_2$-enhanced solution dispersion method to prepare liposome precursor through the preparation of nutrient liposome precursor, then the liposome precursor is hydrated to prepare liposomes, which is a green process route, in which the liposome precursor is prepared in advance, then hydrated with PBS (between pH 6.8-7.2) to obtain liposomes). Those skilled in the art know that when liposomes with 5.5%-50.5% fat-soluble nutrient is prepared, in order to ensure its non-leakage and flow properties, the requirements for emulsification wall materials are relatively high. The prior art generally only uses phospholipids and cholesterol as the main wall materials; since the pH in the emulsification process is acidic, a liposome precursor should be prepared in advance and then hydrated to obtain liposomes.

However, the wall material starch calcium octenyl succinate prepared by the present invention has high emulsifying properties, and its pH value is 6.86-7.20. During the granulation process, the high emulsifying properties of starch calcium octenyl succinate effectively encapsulate the core material, and its specific pH can make liposomes form spontaneously, and liposomes can be obtained after spraying, without subsequent hydration steps, and thus one-step granulation is realized.

In the present invention, unless otherwise specified, the supercritical emulsion refers to an oil-in-water emulsion in a supercritical state.

In the present invention, the term "water-dispersed product" refers to the fact that particles will be wetted by water and can be completely dissolved or completely dispersed in water to form a homogeneous emulsion system. Complete dissolution or complete dispersion in water is an important indicator for evaluating the water dispersible type of solid powder. For example, the method of detecting the particle size of the prepared product in the following examples can determine whether the product is a water-dispersed product. Specifically, the particle size and particle size distribution range of the group of particles are measured by a laser nanoparticle size analyzer. It can be seen that the product is uniformly dispersed in water. If the product is not uniformly dispersed or the particles are not dispersed, that is, the particles are agglomerated, the detection results will not be a normal distribution but have multiple peaks.

In the present invention, unless otherwise specified, the concentration of the modified starch refers to a mass percentage concentration of the modified starch in the entire aqueous solution after the modified starch is dissolved in water.

Beneficial Effects of the Present Invention

The present invention has achieved any one or more of the following technical effects (1) to (8):
(1) the modified starch prepared by the present invention has low viscosity, high emulsifying property and/or good water dispersibility;
(2) the liposome composition of the present invention has good bioavailability;
(3) the stability of the liposome composition of the present invention is good;
(4) the liposome composition of the present invention has higher encapsulation rate;
(5) the average particle size of the liposome composition of the present invention is less than 100 nm, that is, it is nano-scale, and has the characteristics of nanoparticles, which is conducive to digestion and absorption;
(6) the pre-treatment of starch in a supercritical fluid can make it have remarkable slow digestion and anti-digestion properties, so that the finally prepared liposomes have the characteristics of long-term circulation in the body;
(7) the emulsification is carried out in a supercritical fluid, the surface tension is zero or close to zero, which is beneficial to improve the interaction between liposome and starch;
(8) the supercritical emulsion is subjected to spray drying, so the product is obtained by one-step granulation, which fully utilizes the advantages of supercritical fluid to prepare liposomes, and the process is simple and the yield is high.

Specific Models for Carrying Out the Invention

The embodiments of the present invention will be described in detail below with reference to the examples, but those skilled in the art will understand that the following examples are only used to illustrate the present invention, and should not be regarded as limiting the scope of the present invention. If the specific conditions are not indicated in the examples, it is carried out according to the conventional conditions or the conditions suggested by the manufacturer. The reagents or instruments used without the manufacturer's indication are conventional products that can be obtained from the market.

DETAILED DESCRIPTION

Instruments: MS3000 Malvern Laser Particle Size Analyzer, Malvern, UK; High Performance Liquid Chromatograph, Agilent; BT-1000 Powder Comprehensive Characteristic Tester, Dandong Baite Instrument Co., Ltd.
Method:
(1) Detection of Particle Size By using the laser nanoparticle size analyzer, the particle size and particle size distribution of a group of particles were derived through the change of scattered light intensity of particles of different sizes at various angles.

1 g of the prepared product was weighed and placed into a 100 mL beaker, 50 mL of warm water (about 30° C.) was added, and stirred thoroughly; the color of the restored emulsion and whether there was film formation or oil slick on its surface were observed during the dissolution process; and the restored emulsion was finally added to the Malvern laser particle size analyzer, and the particle size of oil droplets in the restored emulsion was measured with the Malvern laser particle size analyzer.

(2) Detection of Encapsulation Rate

By using the high performance liquid chromatography, the active ingredient content and surface active ingredient content of the product were determined. The active ingredient content on the surface of the product referred to the part of the active ingredient that was not embedded, and the petroleum ether rapid extraction method was used.

Encapsulation rate/%=(content of active ingredient in product−content of active ingredient on surface)/content of active ingredient in product× 100%

(3) Detection of Fluidity

The fluidity was evaluated by powder compressibility. The compressibility is determined by: gently loading a certain amount of powder into a graduated cylinder, and measuring an initial loose volume; using the tapping method to make the powder in the tightest state, and measuring a final volume; calculating the loosest density $\rho 0$ and the tightest density $\rho f$; and calculating the compressibility c according to the formula: $c=(\rho f-\rho 0)/\rho f \times 100\%$. When the compressibility was less than 20%, the fluidity of the material was better; when the compressibility was 20%-30%, the fluidity of the material was good; when the compressibility was 30%-40%, the fluidity of the material was normal; and when the compressibility was greater than 50%, the material had no fluidity.

(4) Determination of Emulsification Property

The modified starch was prepared into an aqueous solution with a mass fraction of 0.1%, which was fully dissolved for later use. 25 mL of liquid paraffin was measured out, added to a stoppered tube, and then added with 25 mL of the prepared sample aqueous solution. The stoppered tube was shaken violently 50 times, allowed to stand for 1 min, and the time required for the emulsion to separate out 10 mL of solution was recorded.

(5) Detection of Viscosity

Dynamic viscosity was measured using a rotational viscometer. Operations were performed in accordance with the regulations under each drug item and the instrument manual, and the dynamic viscosity of the test product was calculated according to the following formula.

Dynamic viscosity (Pa·s)=K'α, wherein K' represented a rotational viscometer constant measured with standard liquids of known viscosity values; α represented a deflection angle.

(6) Detection of Water Dispersibility

It was the time required for 1 g of powder particles to form a uniform emulsion system by contacting with 100 ml of water (25° C.) so as to be wetted and completely dissolved or dispersed in water.

The "parts" of each substance mentioned in the following examples, unless otherwise specified, refers to parts by weight.

Example 1: Preparation of Modified Starch Calcium Octenyl Succinate

1) Starch pretreatment: Into a supercritical reactor, 200 parts of raw corn starch as reaction material and 30 parts of ethanol as entrainer were added, and $CO_2$ as reaction medium was charged under high pressure, the temperature and pressure were elevated to reach the supercritical reaction conditions (the pressure was 30 Mpa, the temperature was 40° C.), the reaction was carried out under stirring, the reaction time was 1 hour, and thus the reaction was basically completed;

2) Under the supercritical conditions in which the extraction temperature was 45° C., the pressure was 40 MPa, and the $CO_2$ flow rate was 15 L/h, the product of step 1) was extracted and separated to obtain a pretreated starch (when the $CO_2$ fluid saturated with the dissolved matter entered into the separator, due to the drop of pressure or the change of temperature, $CO_2$ and the extract quickly became two phases that immediately separated to obtain the desired product, and the extraction ended when there was no material at the feeding port);

3) Preparation of modified starch calcium octenyl succinate: Into a supercritical reactor, 100 parts of the pretreated starch obtained in step 1), 6.0 parts of octenyl succinic anhydride, 5.0 parts of calcium hydroxide, 30 parts of water, 17 parts of n-hexane as entrainer were added, and $CO_2$ as reaction medium was charged under high pressure, the temperature and pressure were elevated to reach the supercritical reaction conditions (the pressure was 40 Mpa, and the temperature was 50° C.), the esterification reaction was carried out under stirring, the reaction time was 2 hours, and thus the reaction was basically completed;

4) The product of step 3) was extracted and purified under supercritical conditions in which the extraction temperature was 55° C., the pressure was 45 MPa, and flow rate of $CO_2$ was 20 L/h to obtain a powder of starch calcium octenyl succinate.

The obtained starch calcium octenyl succinate had a viscosity of 60 mPa·s at 25° C.; when it emulsified liquid paraffin, the time required for the emulsion to separate 10 mL of solution was 1175 s; the time required for 1 g of the starch calcium octenyl succinate to form a uniform emulsion system by contacting with 100 ml of water (25° C.) so as to be wetted and completely dissolved or dispersed in water was 55 s.

Example 2: Preparation of Modified Starch Barium Octenyl Succinate

1) Starch pretreatment: Into a supercritical reactor, 200 parts of raw corn starch as reaction material and 20 parts of ethanol as entrainer were added, and $CO_2$ as reaction medium was charged under high pressure, the temperature and pressure were elevated to reach the supercritical reaction conditions (the pressure was 30 Mpa, the temperature was 35° C.), the reaction was carried out under stirring, the reaction time was 2 h, and thus the reaction was basically completed;

2) Under the supercritical conditions in which the extraction temperature was 40° C., the pressure was 30 MPa, and the $CO_2$ flow rate was 10 L/h, the product of step 1) was extracted and separated to obtain a pretreated starch (when the $CO_2$ fluid saturated with the dissolved matter entered into the separator, due to the drop of pressure or the change of temperature, $CO_2$ and the extract quickly became two phases that immediately separated to obtain the desired product, and the extraction ended when there was no material at the feeding port);

3) Preparation of modified starch barium octenyl succinate: Into a supercritical reactor, 100 parts of the pretreated starch obtained in step 1), 6.0 parts of octenyl succinic anhydride, 5.0 parts of barium hydroxide, 30 parts of water, 17 parts of n-hexane as entrainer were added, and $CO_2$ as reaction medium was charged under high pressure, the temperature and pressure were elevated to reach the supercritical reaction conditions (the pressure was 30 Mpa, and the temperature was 60° C.), the esterification reaction was carried out under stirring, the reaction time was 1.5 hours, and thus the reaction was basically completed;

4) The product of step 3) was extracted and purified under supercritical conditions in which the extraction temperature was 65° C., the pressure was 40 MPa, and flow rate of $CO_2$ was 20 L/h to obtain a powder of starch barium octenyl succinate.

The obtained starch barium octenyl succinate had a viscosity of 82 mPa·s at 25° C.; when it emulsified liquid paraffin, the time required for the emulsion to separate 10 mL of solution was 1016 s; the time required for 1 g of the starch barium octenyl succinate to form a uniform emulsion system by contacting with 100 ml of water (25° C.) so as to be wetted and completely dissolved or dispersed in water was 93 s.

Example 3: Preparation of Modified Starch Aluminum Octenyl Succinate

1) Starch pretreatment: Into a supercritical reactor, 200 parts of raw tapioca starch as reaction material and 40 parts of ethanol as entrainer were added, and $CO_2$ as reaction medium was charged under high pressure, the temperature and pressure were elevated to reach the supercritical reaction conditions (the pressure was 40 Mpa, the temperature was 50° C.), the reaction was carried out under stirring, the reaction time was 0.5 h, and thus the reaction was basically completed;

2) Under the supercritical conditions in which the extraction temperature was 50° C., the pressure was 50 MPa, and the $CO_2$ flow rate was 25 L/h, the product of step 1) was extracted and separated to obtain a pretreated starch (when the $CO_2$ fluid saturated with the dissolved matter entered into the separator, due to the drop of pressure or the change of temperature, $CO_2$ and the extract quickly became two phases that immediately separated to obtain the desired product, and the extraction ended when there was no material at the feeding port);

3) Preparation of modified starch aluminum octenyl succinate: Into a supercritical reactor, 100 parts of the pretreated starch obtained in step 1), 6.0 parts of octenyl succinic anhydride, 5.0 parts of aluminum hydroxide, 30 parts of water, 17 parts of n-hexane as entrainer were added, and $CO_2$ as reaction medium was charged under high pressure, the temperature and pressure were elevated to reach the supercritical reaction conditions (the pressure was 45 Mpa, and the temperature was 60° C.), the esterification reaction was carried out under stirring, the reaction time was 1 hours, and thus the reaction was basically completed;

4) The product of step 3) was extracted and purified under supercritical conditions in which the extraction temperature was 65° C., the pressure was 50 MPa, and flow rate of $CO_2$ was 25 L/h to obtain a powder of starch aluminum octenyl succinate.

The obtained starch aluminum octenyl succinate had a viscosity of 62 mPa·s at 25° C.; when it emulsified liquid paraffin, the time required for the emulsion to separate 10 mL of solution was 1570 s; the time required for 1 g of the starch aluminum octenyl succinate to form a uniform emulsion system by contacting with 100 ml of water (25° C.) so as to be wetted and completely dissolved or dispersed in water was 73 s.

Example 4: Preparation of Modified Starch Iron Octenyl Succinate

1) Starch pretreatment: Into a supercritical reactor, 200 parts of raw potato starch as reaction material and 60 parts of ethanol as entrainer were added, and $CO_2$ as reaction medium was charged under high pressure, the temperature and pressure were elevated to reach the supercritical reaction conditions (the pressure was 40 Mpa, the temperature was 50° C.), the reaction was carried out under stirring, the reaction time was 0.8 h, and thus the reaction was basically completed;

2) Under the supercritical conditions in which the extraction temperature was 50° C., the pressure was 50 MPa, and the $CO_2$ flow rate was 10 L/h, the product of step 1) was extracted and separated to obtain a pretreated starch (when the $CO_2$ fluid saturated with the dissolved matter entered into the separator, due to the drop of pressure or the change of temperature, $CO_2$ and the extract quickly became two phases that immediately separated to obtain the desired product, and the extraction ended when there was no material at the feeding port);

3) Preparation of modified starch iron octenyl succinate: Into a supercritical reactor, 100 parts of the pretreated starch obtained in step 1), 6.0 parts of octenyl succinic anhydride, 5.0 parts of iron hydroxide, 30 parts of water, 17 parts of n-hexane as entrainer were added, and $CO_2$ as reaction medium was charged under high pressure, the temperature and pressure were elevated to reach the supercritical reaction conditions (the pressure was 30 Mpa, and the temperature was 50° C.), the esterification reaction was carried out under stirring, the reaction time was 1.8 hours, and thus the reaction was basically completed;

4) The product of step 3) was extracted and purified under supercritical conditions in which the extraction temperature was 55° C., the pressure was 40 MPa, and flow rate of $CO_2$ was 25 L/h to obtain a powder of starch iron octenyl succinate.

The obtained starch iron octenyl succinate had a viscosity of 70 mPa·s at 25° C.; when it emulsified liquid paraffin, the time required for the emulsion to separate 10 mL of solution was 1609 s; the time required for 1 g of the starch iron octenyl succinate to form a uniform emulsion system by contacting with 100 ml of water (25° C.) so as to be wetted and completely dissolved or dispersed in water was 75 s.

Example 5: Preparation of Coenzyme Q10 Nanoliposome (1) 5050 g of coenzyme Q10 crystal, 10 g of piperine (absorption enhancer), 2500 g of hydrogenated lecithin, 800 g of cholesterol, 5 g of rosemary extract and 1255 g of absolute ethanol were weighed, and stirred to fully dissolve and prepare a solution, and placed in an ultrasonic shaker for 5 minutes to obtain a solution containing coenzyme Q10.

(2) 1635 g of the starch calcium octenyl succinate prepared in Example 1 was dissolved in 800 g of water to prepare an aqueous solution.

(3) When the supercritical reactor reached the set temperature, the carbon dioxide cylinder was opened, after the carbon dioxide gas was cooled into a liquid by a cooler, the aqueous solution prepared in step (2) was pressurized by a high-pressure pump into the reactor, and a magnetic stirrer (40 KW) was turned on, then the solution containing coenzyme Q10 prepared in step (1) was added to the aqueous solution at a certain flow rate, and the two were stirred and mixed at high speed in the supercritical fluid; the pressure (30 MPa) and temperature (65° C.) were controlled, and kept for a period of time (40 min); a supercritical emulsion was thus formed.

(4) The supercritical emulsion prepared in step (3) was spray-dried through a nozzle (diameter was 500 m, temperature was 80° C.) at a flow rate of 2.5 L/min, and after dispersion and precipitation, coenzyme Q10 nanoliposome was obtained.

The coenzyme Q10 nanoliposome had a number-average particle size of 99 nm, a particle size distribution range of from 80 nm to 119 nm, an encapsulation rate of about 92%, and good fluidity.

Example 6: Preparation of Coenzyme Q10 Nanoliposome (1) 550 g of coenzyme Q10 crystal, 1 g of piperine (absorption enhancer), 500 g of egg yolk lecithin, 7500 g of cholesterol, 2 g of rosemary extract and 1283 g of absolute ethanol were weighed, and stirred to fully dissolve and prepare a solution, and placed in an ultrasonic shaker for 5 minutes to obtain a solution containing coenzyme Q10.

(2) 1447 g of the starch calcium octenyl succinate prepared in Example 1 was dissolved in 700 g of water to prepare an aqueous solution.

(3) When the supercritical reactor reached the set temperature, the carbon dioxide cylinder was opened, after the carbon dioxide gas was cooled into a liquid by a cooler, the aqueous solution prepared in step (2) was pressurized by a high-pressure pump into the reactor, and a magnetic stirrer (30 KW) was turned on, then the solution containing coenzyme Q10 prepared in step (1) was added to the aqueous solution at a certain flow rate, and the two were stirred and mixed at high speed in the supercritical fluid; the pressure (30 MPa) and temperature (60° C.) were controlled, and kept for a period of time (40 min); a supercritical emulsion was thus formed.

(4) The supercritical emulsion prepared in step (3) was spray-dried through a nozzle (diameter was 500 m, temperature was 80° C.) at a flow rate of 5 L/min, and after dispersion and precipitation, coenzyme Q10 nanoliposome was obtained.

The coenzyme Q10 nanoliposome had a number-average particle size of 82 nm, a particle size distribution range of from 72 nm to 114 nm, an encapsulation rate of about 90.5%, and good fluidity.

Example 7: Preparation of Coenzyme Q10 Nanoliposome (1) 1100 g of coenzyme Q10 crystal, 1 g of piperine, 1100 g of egg yolk lecithin, 5795 g of cholesterol, 2 g of natural VE, 2 g of rosemary extract and 1200 g of absolute ethanol were weighed, and stirred to fully dissolve and prepare a solution, and placed in an ultrasonic shaker for 5 minutes to obtain a solution containing coenzyme Q10.

(2) 2000 g of the starch calcium octenyl succinate prepared in Example 1 was dissolved in 1000 g of water to prepare an aqueous solution.

(3) When the supercritical reactor reached the set temperature, the carbon dioxide cylinder was opened, after the carbon dioxide gas was cooled into a liquid by a cooler, the aqueous solution prepared in step (2) was pressurized by a high-pressure pump into the reactor, and a magnetic stirrer (40 KW) was turned on, then the solution containing coenzyme Q10 prepared in step (1) was added to the aqueous solution at a certain flow rate, and the two were stirred and mixed at high speed in the supercritical fluid; the pressure (30 MPa) and temperature (60° C.) were controlled, and kept for a period of time (30 min); a supercritical emulsion was thus formed.

(4) The supercritical emulsion prepared in step (3) was spray-dried through a nozzle (diameter was 500 m, temperature was 80° C.) at a flow rate of 5 L/min, and after dispersion and precipitation, coenzyme Q10 nanoliposome was obtained.

The coenzyme Q10 nanoliposome had a number-average particle size of 85 nm, a particle size distribution range of from 68 nm to 103 nm, an encapsulation rate of about 94%, and good fluidity.

Example 8: Preparation of Coenzyme Q10 Nanoliposome (1) 1100 g of coenzyme Q10 crystal, 1 g of piperine, 2100 g of soybean lecithin, 5795 g of cholesterol, 2 g of natural VE, 2 g of rosemary extract and 1350 g of absolute ethanol were weighed, and stirred to fully dissolve and prepare a solution, and placed in an ultrasonic shaker for 5 minutes to obtain a solution containing coenzyme Q10.

(2) 1000 g of the starch calcium octenyl succinate prepared in Example 1 was dissolved in 500 g of water to prepare an aqueous solution.

(3) When the supercritical reactor reached the set temperature, the carbon dioxide cylinder was opened, after the carbon dioxide gas was cooled into a liquid by a cooler, the aqueous solution prepared in step (2) was pressurized by a high-pressure pump into the reactor, and a magnetic stirrer (15 KW) was turned on, then the solution containing coenzyme Q10 prepared in step (1) was added to the aqueous solution at a certain flow rate, and the two were stirred and mixed at high speed in the supercritical fluid; the pressure (30 MPa) and temperature (60° C.) were controlled, and kept for a period of time (60 min); a supercritical emulsion was thus formed.

(4) The supercritical emulsion prepared in step (3) was spray-dried through a nozzle (diameter was 500 m, temperature was 80° C.) at a flow rate of 5 L/min, and after dispersion and precipitation, coenzyme Q10 nanoliposome was obtained.

The coenzyme Q10 nanoliposome had a number-average particle size of 87.5 nm, a particle size distribution range of from 71 nm to 107 nm, an encapsulation rate of about 91.8%, and good fluidity.

Example 9: Preparation of Curcumin Nanoliposome (1) 550 g of curcumin crystal, 1 g of piperine, 500 g of hydrogenated lecithin, 7500 g of cholesterol, 2 g of natural VE, and 1283 g of absolute ethanol were weighed, and stirred to fully dissolve and prepare a solution, and placed in an ultrasonic shaker for 5 minutes to obtain a solution containing curcumin.

(2) 1447 g of the starch calcium octenyl succinate prepared in Example 1 was dissolved in 700 g of water to prepare an aqueous solution.

(3) When the supercritical reactor reached the set temperature, the carbon dioxide cylinder was opened, after the carbon dioxide gas was cooled into a liquid by a cooler, the aqueous solution prepared in step (2) was pressurized by a high-pressure pump into the reactor, and a magnetic stirrer (30 KW) was turned on, then the solution containing curcumin prepared in step (1) was added to the aqueous solution at a certain flow rate, and the two were stirred and mixed at high speed in the supercritical fluid; the pressure (30 MPa) and temperature (50° C.) were controlled, and kept for a period of time (40 min); a supercritical emulsion was thus formed.

(4) The supercritical emulsion prepared in step (3) was spray-dried through a nozzle (diameter was 500 m, temperature was 80° C.) at a flow rate of 2.5 L/min, and after dispersion and precipitation, curcumin nanoliposome was obtained.

The curcumin nanoliposome had a number-average particle size of 96 nm, a particle size distribution range of from 81 nm to 115 nm, an encapsulation rate of about 91.3%, and good fluidity.

Example 10: Preparation of Vitamin a Nanoliposome (1) 1100 g of vitamin A acetate crystal, 1 g of piperine, 2100 g of soybean lecithin, 5795 g of cholesterol, 2 g of natural VE, 2 g of rosemary extract and 1350 g of absolute ethanol were weighed, and stirred to fully dissolve and prepare a solution, and placed in an ultrasonic shaker for 5 minutes to obtain a solution containing vitamin A acetate.

(2) 1000 g of the starch calcium octenyl succinate prepared in Example 1 was dissolved in 500 g of water to prepare an aqueous solution.

(3) When the supercritical reactor reached the set temperature, the carbon dioxide cylinder was opened, after the carbon dioxide gas was cooled into a liquid by a cooler, the aqueous solution prepared in step (2) was pressurized by a high-pressure pump into the reactor, and a magnetic stirrer (15 KW) was turned on, then the solution containing vitamin A acetate prepared in step (1) was added to the aqueous solution at a certain flow rate, and the two were stirred and mixed at high speed in the supercritical fluid; the pressure (30 MPa) and temperature (60° C.) were controlled, and kept for a period of time (50 min); a supercritical emulsion was thus formed.

(4) The supercritical emulsion prepared in step (3) was spray-dried through a nozzle (diameter was 500 m, temperature was 80° C.) at a flow rate of 5 L/min, and after dispersion and precipitation, vitamin A acetate nanoliposome was obtained.

The vitamin A acetate nanoliposome had a number-average particle size of 85.5 nm, a particle size distribution range of from 73 nm to 105 nm, an encapsulation rate of about 92.7%, and good fluidity.

Example 11: Preparation of β-Carotene Nanoliposome (1) 550 g of β-carotene crystal, 1 g of piperine, 2000 g of hydrogenated lecithin, 6000 g of cholesterol, 2 g of natural VE and 1283 g of absolute ethanol were weighed, and stirred to fully dissolve and prepare a solution, and placed in an ultrasonic shaker for 5 minutes to obtain a solution containing β-carotene.

(2) 1447 g of the starch calcium octenyl succinate prepared in Example 1 was dissolved in 700 g of water to prepare an aqueous solution.

(3) When the supercritical reactor reached the set temperature, the carbon dioxide cylinder was opened, after the carbon dioxide gas was cooled into a liquid by a cooler, the aqueous solution prepared in step (2) was pressurized by a high-pressure pump into the reactor, and a magnetic stirrer (30 KW) was turned on, then the solution containing β-carotene prepared in step (1) was added to the aqueous solution at a certain flow rate, and the two were stirred and mixed at high speed in the supercritical fluid; the pressure (30 MPa)

and temperature (60° C.) were controlled, and kept for a period of time (60 min); a supercritical emulsion was thus formed.

(4) The supercritical emulsion prepared in step (3) was spray-dried through a nozzle (diameter was 500 m, temperature was 80° C.) at a flow rate of 2.5 L/min, and after dispersion and precipitation, β-carotene nanoliposome was obtained.

The β-carotene nanoliposome had a number-average particle size of 93 nm, a particle size distribution range of from 80 nm to 108 nm, an encapsulation rate of about 90.7%, and good fluidity.

Example 12: Preparation of DHA Nanoliposome (1) 4000 g of DHA algal oil, 1 g of piperine, 2200 g of soy bean lecithin, 2295 g of cholesterol, 2 g of natural VE, 2 g of rosemary extract and 1275 g of absolute ethanol were weighed, and stirred to fully dissolve and prepare a solution, and placed in an ultrasonic shaker for 5 minutes to obtain a solution containing DHA.

(2) 1500 g of the starch calcium octenyl succinate prepared in Example 1 was dissolved in 700 g of water to prepare an aqueous solution.

(3) When the supercritical reactor reached the set temperature, the carbon dioxide cylinder was opened, after the carbon dioxide gas was cooled into a liquid by a cooler, the aqueous solution prepared in step (2) was pressurized by a high-pressure pump into the reactor, and a magnetic stirrer (15 KW) was turned on, then the solution containing DHA prepared in step (1) was added to the aqueous solution at a certain flow rate, and the two were stirred and mixed at high speed in the supercritical fluid; the pressure (30 MPa) and temperature (50° C.) were controlled, and kept for a period of time (30 min); a supercritical emulsion was thus formed.

(4) The supercritical emulsion prepared in step (3) was spray-dried through a nozzle (diameter was 500 m, temperature was 80° C.) at a flow rate of 2 L/min, and after dispersion and precipitation, DHA nanoliposome was obtained.

The DHA nanoliposome had a number-average particle size of 82.5 nm, a particle size distribution range of from 70 nm to 96 nm, an encapsulation rate of about 94.3%, and good fluidity.

Example 13: Preparation of Coenzyme Q10 Nanoliposome

The starch calcium octenyl succinate in step (2) was replaced with the starch barium octenyl succinate prepared in Example 2, and the rest of the experimental conditions were the same as those in Example 5, and the obtained coenzyme Q10 nanoliposome had a number-average particle size of 90.2 nm, a particle size distribution range of from 78 nm to 99 nm, an encapsulation rate of about 91.5%, and good fluidity.

Example 14: Preparation of Coenzyme Q10 Nanoliposome

The starch calcium octenyl succinate in step (2) was replaced with the starch aluminum octenyl succinate prepared in Example 3, and the rest of the experimental conditions were the same as those in Example 5, and the obtained coenzyme Q10 nanoliposome had a number-average particle size of 78.7 nm, a particle size distribution range of from 63 nm to 86 nm, an encapsulation rate of about 96.5%, and good fluidity.

Example 15: Preparation of Coenzyme Q10 Nanoliposome

The starch calcium octenyl succinate in step (2) was replaced with the starch iron octenyl succinate prepared in Example 4, and the remaining experimental conditions were the same as those in Example 5, and the obtained coenzyme Q10 nanoliposome had a number-average particle size of 77.6 nm, a particle size distribution range of from 62 nm to 85 nm, an encapsulation rate of about 97.1%, and good fluidity.

Comparative Example 1

Coenzyme Q10 nanoliposome was prepared according to the method of Example 5, except that no piperine was added, and the remaining conditions were the same as those in Example 5, and a reference Coenzyme Q10 nanoliposome was obtained.

The liposome had a number-average particle size of 96 nm, a particle size distribution range of from 78 nm to 117 nm, an encapsulation rate of about 91.2%, and good fluidity.

The results showed that the absence of piperine had no significant effect on the particle size distribution, encapsulation rate and flow property of the prepared CoQ10 liposome.

Comparative Example 2

Coenzyme Q10 nanoliposome was prepared according to the method of Example 5, except that starch calcium octenyl succinate was not added, and the remaining conditions were the same as those in Example 5, and a reference coenzyme Q10 nanoliposome was obtained.

The liposome had a number-average particle size of 113 nm, a particle size distribution range of 83 nm-139 nm, an encapsulation rate of about 73%, and a relatively average fluidity.

The results showed that without adding the starch calcium octenyl succinate prepared by the method of the present invention, the encapsulation rate of the coenzyme Q10 liposome prepared by the method of the present invention was significantly reduced and the fluidity of the liposome was deteriorated.

Comparative Example 3

Preparation of modified starch calcium octenyl succinate: The modified starch calcium octenyl succinate was prepared according to the method of Example 1, except that it did not undergo step 1), but the same mass of the raw corn starch without being pretreated by supercritical fluid was directly used to perform the preparation reaction of step 3), and the remaining conditions were the same as those in Example 1, and a starch calcium octenyl succinate was obtained.

The viscosity of the obtained starch calcium octenyl succinate at 25° C. was 530 mPa·s; when it emulsified liquid paraffin, the time required for the emulsion to separate 10 mL of solution was 533 s; the time required for 1 g of the starch calcium octenyl succinate to form a uniform emulsion system by contacting with 100 ml of water (25° C.) so as to be wetted and completely dissolved or dispersed in water was 287 s.

Preparation of coenzyme Q10 nanoliposome: The starch calcium octenyl succinate prepared by the above method was taken to obtain a reference coenzyme Q10 nanoliposome according to the experimental conditions of Example 5.

The liposome had a number-average particle size of 98 nm, a particle size distribution range of 81 nm-121 nm, an encapsulation rate of about 85%, and good fluidity.

The results showed that the modified starch calcium octenyl succinate prepared without supercritical fluid pretreatment were significantly deteriorated in terms of emulsification and water-soluble dispersibility, and the encapsulation rate of the prepared coenzyme Q10 nanoliposome was affected.

Comparative Example 4

Coenzyme Q10 liposome was prepared according to the method of Example 5, except that starch calcium octenyl succinate was purchased from the market (brand: SANFU, model: SANFU MS6135) (the raw starch was not pretreated), and the remaining conditions were the same as those in Example 5, and a reference coenzyme Q10 nanoliposome was obtained.

The liposome had a number-average particle size of 115 nm, a particle size distribution range of 85 nm-136 nm, an encapsulation rate of about 76%, and a relatively average fluidity.

The results showed that the encapsulation rate of the coenzyme Q10 liposome prepared by the commercially available starch calcium octenyl succinate was significantly lower and the liposome fluidity became worse in comparison with the starch calcium octenyl succinate prepared by the supercritical method.

Comparative Example 5

Preparation of modified starch calcium octenyl succinate: Modified starch calcium octenyl succinate was prepared according to the method of Example 1, except that in the starch pretreatment of step 1), the supercritical fluid technology was not adopted, but the following method was used: ethanol and deionized water in a ratio of 1:1 were mixed, stirred and added with a certain amount of starch to prepare a starch milk with a concentration of 0.15 g/mL, homogenized thoroughly, added into a reactor and heated to 85° C., and incubated and reacted for 60 min. The obtained sample was washed with 95% ethanol by volume, filtered, dried, and pulverized through a 120-mesh sieve. All the other steps were the same as those in Example 1, and a starch calcium octenyl succinate was obtained.

The obtained starch calcium octenyl succinate had a viscosity of 150 MPa s at 25° C.; when it emulsified liquid paraffin, the time required for the emulsion to separate 10 mL of solution was 828 s; the time required for 1 g of the starch calcium octenyl succinate to form a uniform emulsion system by contacting with 100 ml of water (25° C.) so as to be wetted and completely dissolved or dispersed in water was 102 s.

Preparation of coenzyme Q10 nanoliposome: The starch calcium octenyl succinate prepared by the above method was taken, and a reference coenzyme Q10 nanoliposome was obtained according to the experimental conditions of Example 5.

The liposome had a number-average particle size of 97 nm, a particle size distribution range of 86 nm-107 nm, an encapsulation rate of about 89%, and a good fluidity.

The results showed that, compared with the starch calcium octenyl succinate prepared in Example 1, the starch calcium octenyl succinate prepared by the method of Comparative Example 5 had significantly worse emulsifying property and water-soluble dispersibility, and the modified starch had an increased viscosity; in addition, the coenzyme Q10 nanoliposome prepared in Comparative Example 5 had a decreased encapsulation rate.

Comparative Example 6

Preparation of modified starch calcium octenyl succinate: Modified starch calcium octenyl succinate was prepared according to the method of Example 1, except that in step 3), the supercritical fluid technology method was replaced by a common method: adjusting the pH value of starch milk to 7-8 with $Ca(OH)_2$, slowly and uniformly adding octenyl succinic anhydride (addition amount was 3%, relative to dry starch) to the starch milk (mass fraction of 40%) at 40° C. to perform esterification, the reaction time as 2.5 h, then filtration, washing with 95% ethanol and drying were carried out to obtain a product starch calcium octenyl succinate, in which the remaining experimental conditions were the same as those in Example 1.

The obtained starch calcium octenyl succinate had a viscosity of 215 MPa·s at 25° C.; when it emulsified liquid paraffin, the time required for the emulsion to separate 10 mL of solution was 706 s; the time required for 1 g of the starch calcium octenyl succinate to form a uniform emulsion system by contacting with 100 ml of water (25° C.) so as to be wetted and completely dissolved or dispersed in water was 169 s.

Preparation of coenzyme Q10 nanoliposome: The starch calcium octenyl succinate prepared by the above method was taken, and a reference coenzyme Q10 nanoliposome was obtained according to the experimental conditions of Example 5.

The liposome had a number-average particle size of 98 nm, a particle size distribution range of 88 nm-118 nm, an encapsulation rate of about 82%, and a good fluidity.

The results showed that, compared with the starch calcium octenyl succinate prepared in Example 1, the starch calcium octenyl succinate prepared by the method of Comparative Example 6 had significantly worse emulsifying property and water-soluble dispersibility, and the modified starch had a significantly increased viscosity; In addition, the encapsulation rate of the coenzyme Q10 nanoliposome prepared in Comparative Example 6 was significantly reduced.

Comparative Example 7

5050 g of coenzyme Q10 crystal, 10 g of piperine, 2500 g of hydrogenated lecithin, 800 g of cholesterol, and 5 g of rosemary extract were taken, added to a certain amount of absolute ethanol (mass fraction was 50%), and fully dissolved under a 55° C. water bath to obtain a mixture solution, the mixture solution was subjected to rotary evaporation to remove ethanol (55° C., vacuum degree of 0.1 MPa), and cool rapidly to obtain a nanoemulsion, and then 1635 g of starch calcium octenyl succinate prepared in Example 1 in PBS solution was added to the nanoemulsion to obtain an aqueous suspension (hydration temperature was 55° C., and hydration medium was 0.01 mol/L phosphate buffer), which was finally centrifuged and lyophilized to obtain a reference coenzyme Q10 nanoliposome.

The liposome had a number-average particle size of 165 nm, a particle size distribution range of 75 nm-267 nm, an encapsulation rate of about 79%, and a relatively average fluidity.

The results showed that the coenzyme Q10 nanoliposome prepared by the method of Comparative Example 7 had a particle size significantly larger than that of Example 5, and its liposome encapsulation rate and fluidity were significantly worse.

Test Example 1: Stability Test

For the coenzyme Q10 liposomes obtained in Examples 5-8 and 13-15 (numbered W1 to W7, respectively) and the reference Coenzyme Q10 liposomes obtained in Comparative Examples 1-7 (numbered DW1 to DW7), four samples were taken from each of them, sealed in non-transparent vials, and allowed to stand at 25° C. (incubator) to perform accelerated aging test, in which one sample was used as control, one sample was allowed to stand for 10 days, one sample was allowed to stand for 20 days, and one sample was allowed to stand for 30 days. The content of coenzyme Q10 was determined by HPLC method, and their stability performances in the accelerated aging test was investigated.

Chromatographic conditions: chromatographic column: C18 column, 150 mm×4.6 mm, 5 μm; mobile phase: V(methanol):V(ethanol)=1:9; flow rate: 1.0 mL/min; detection wavelength: 275 nm; injection volume: 20 μL; column temperature: room temperature.

The results were shown in Table 1.

TABLE 1

| Test item | Sample | Day 0 | Day 10 | Day 20 | Day 30 |
|---|---|---|---|---|---|
| Change in Q10 content | W1 | 100% | 98.6% | 97.2% | 96.8% |
| | W2 | 100% | 98.3% | 96.5% | 94.9% |
| | W3 | 100% | 99.1% | 98.3% | 97.6% |
| | W4 | 100% | 98.7% | 97.8% | 96.5% |
| | W5 | 100% | 98.5% | 96.9% | 96.6% |
| | W6 | 100% | 99.0% | 98.5% | 97.9% |
| | W7 | 100% | 98.9% | 98.2% | 97.8% |
| | DW1 | 100% | 98.5% | 97.0% | 95.7% |
| | DW2 | 100% | 95.0% | 90.1% | 86.7% |
| | DW3 | 100% | 95.9% | 93.5% | 89.2% |
| | DW4 | 100% | 95.1% | 92.3% | 87.5% |
| | DW5 | 100% | 96.5% | 94.9% | 91.3% |
| | DW6 | 100% | 95.3% | 92.5% | 87.9% |
| | DW7 | 100% | 90.4% | 87.6% | 79.3% |

The results in Table 1 showed that:

Compared W1 with DW1, it was showed that the stability of CoQ10 liposome prepared with W1 without adding piperine was not significantly affected;

Compared W1 with DW2, DW3, DW4, DW5 and DW6, it was shown that the coenzyme Q10 liposome prepared with the starch calcium octenyl succinate prepared by the method of the present invention had a significantly improved stability of coenzyme Q10;

Compared W1 with DW7, it was shown that the coenzyme Q10 liposome prepared by the supercritical fluid technology had a significantly improved stability of coenzyme Q10 as compared with the coenzyme Q10 liposome prepared by conventional technology, and when the supercritical fluid technology was used to prepare supercritical coenzyme Q10 liposomes with starch calcium octenyl succinate, starch barium octenyl succinate, starch aluminum octenyl succinate or starch iron octenyl succinate as stabilizer, a superior aging stability was observed in the accelerated aging test.

Test Example 2: In Vivo Pharmacokinetic Experiment of Coenzyme Q10 Nanoliposomes It had been confirmed by animal experiments that the coenzyme Q10 nanoliposomes of the present invention showed significantly improved absorption performance of coenzyme Q10. The experimental steps and results were as follows:

1.1 Sample:
Sample W1: Coenzyme Q10 nanoliposome prepared in Example 5;
Sample W2: Coenzyme Q10 nanoliposome prepared in Example 13;
Sample W3: Coenzyme Q10 nanoliposome prepared in Example 14;
Sample W4: Coenzyme Q10 nanoliposome prepared in Example 15;
Reference sample DW1: Coenzyme Q10 nanoliposome prepared in Comparative Example 1;
Reference sample DW2: Coenzyme Q10 nanoliposome prepared in Comparative Example 2;
Reference sample DW3: Coenzyme Q10 nanoliposome prepared in Comparative Example 3;
Reference sample DW4: Coenzyme Q10 nanoliposome prepared in Comparative Example 4;
Reference sample DW5: Coenzyme Q10 nanoliposome prepared in Comparative Example 5;
Reference sample DW6: Coenzyme Q10 nanoliposome prepared in Comparative Example 6;
Reference sample DW7: Coenzyme Q10 nanoliposome prepared in Comparative Example 7;

A total of 11 samples were subjected to the animal experiment.

1.2 Experimental Animals and Groups:
SPF grade Kunming male mice, 3 months old, weight 18-22 g, were provided by Dongchuang Laboratory Animal Science and Technology Service Department of Kaifu District, Changsha City (experimental animal use permit license number: SYXK (Xiang) 2010-0010). The animals were operated in accordance with the international guidelines for laboratory animal experiments to reduce the suffering of laboratory animals during the experiment. The mice were randomly divided into 10 groups by a completely random design, a total of 11 groups.

1.3 Experimental Conditions:
In order to shield the environment, during the experiment, the ambient temperature was 23° C.-24° C., the humidity was 50%-56%, and deionized water and standard feed were freely ingested daily.

1.4 Oral Administration and Sample Collection:
The mice fasted for 12 h were randomly divided into 11 groups, 10 mice per group. The example samples W1 to W4 and the reference samples DW1 to DW7 were respectively administrated to mice by gavage at a dose of 50 mg/kg, so that 5 mice in each group were subjected to blood collection in heparin anticoagulation tubes at each of the following time points, 5, 15, 30 min and 1, 2, 4, 6, 12 h after administration, respectively, and samples were measured after centrifugation.

1.5 Pharmacokinetic Experiments:
After the mice were orally administered (50 mg/kg) with the samples of the examples and the reference samples, the plasma samples obtained in the experiment were processed and loaded to HPLC for analysis and determination. Fitting analysis was performed according to the blood drug concentration results, and the blood drug concentration data were calculated.

TABLE 2

Pharmacokinetic parameters of oral administration of samples in mice

| Parameter | Sample W1 | Sample W2 | Sample W3 | Sample W4 | Reference sample DW1 | Reference sample DW2 |
|---|---|---|---|---|---|---|
| AUC (O-t)/(mg · L − 1 · h) | 38.2 ± 5.7 | 38.0 ± 5.9 | 39.1 ± 5.6 | 38.6 ± 5.5 | 30.8 ± 6.2 | 21.2 ± 7.6 |
| AUC(0-∞)/(mg · L − 1 · h) | 39.5 ± 6.1 | 39.1 ± 5.9 | 39.8 ± 6.3 | 39.7 ± 6.2 | 31.6 ± 6.3 | 22.7 ± 7.8 |
| t½/h | 12.76 ± 0.8 | 12.67 ± 0.7 | 12.87 ± 0.8 | 12.81 ± 0.7 | 10.68 ± 0.7 | 8.82 ± 0.8 |
| MRT(O-t)/h | 11.63 ± 0.61 | 11.35 ± 0.55 | 11.92 ± 0.63 | 11.85 ± 0.59 | 9.71 ± 0.38 | 8.11 ± 0.33 |
| MRT(O-∞)/h | 12.85 ± 1.13 | 12.62 ± 1.04 | 12.95 ± 1.16 | 12.83 ± 1.14 | 10.73 ± 0.83 | 9.82 ± 0.68 |

| Parameter | Reference sample DW3 | Reference sample DW4 | Reference sample DW5 | Reference sample DW6 | Reference sample DW7 |
|---|---|---|---|---|---|
| AUC (O-t)/(mg · L − 1 · h) | 29.0 ± 6.8 | 25.6 ± 7.1 | 32.5 ± 5.6 | 28.1 ± 6.9 | 17.2 ± 8.2 |
| AUC(0-∞)/(mg · L − 1 · h) | 30.3 ± 7.5 | 27.1 ± 7.3 | 33.8 ± 5.3 | 29.3 ± 7.2 | 18.3 ± 8.5 |
| t½/h | 10.12 ± 0.8 | 8.51 ± 0.7 | 10.35 ± 0.7 | 9.72 ± 0.8 | 6.73 ± 0.8 |
| MRT(O-t)/h | 9.71 ± 0.35 | 8.32 ± 0.51 | 9.91 ± 0.42 | 9.11 ± 0.35 | 6.71 ± 0.35 |
| MRT(O-∞)/h | 10.13 ± 0.79 | 9.03 ± 0.93 | 10.63 ± 0.79 | 10.52 ± 0.65 | 7.13 ± 0.79 |

The area under the plasma concentration-time curve (AUC) was the most reliable indicator for assessing bioavailability. From Table 2, it could be seen that the AUC of the sample W1 was larger than the ratio values of the reference samples. The bioavailability of a pharmaceutical preparation is determined, generally by a ratio of the area under drug-time curve (AUC) of a drug administered via a non-vascular route (e.g., oral administration, op) to that of a reference preparation of the drug administered via, for example, intravenous (iv) or the same route (po), and expressed as absorption percentage.

Compared the sample W1 with the reference sample DW1, the AUC(O-t) and AUC(0-∞) of the supercritical coenzyme Q10 nanoliposome was increased by 24% and 25%, respectively, indicating that the addition of piperine in the supercritical coenzyme Q10 nanoliposome could further improve the bioavailability of coenzyme Q10.

Compared the sample W1 with the reference sample DW2, the AUC(O-t) and AUC(0-∞) of the supercritical coenzyme Q10 nanoliposome was increased by 80% and 74%, respectively, indicating that starch calcium octenyl succinate as a stabilizer and wall material could better protect the activity of fat-soluble substance and improve its bioavailability.

Compared the sample W1 with the reference sample DW3, the AUC(O-t) and AUC(0-∞) of the supercritical coenzyme Q10 nanoliposome was increased by 31.7% and 30.4%, respectively. Compared the sample W1 with the reference sample DW4, the AUC(O-t) and AUC(0-∞) of the supercritical coenzyme Q10 nanoliposome was increased by 49.2% and 45.8%, respectively. Compared the sample W1 with the reference sample DW5, the AUC(O-t) and AUC(0-∞) of the supercritical coenzyme Q10 nanoliposome was increased by 17.5% and 16.9%, respectively, indicating that after the starch was pretreated by the supercritical fluid technology, it showed significant anti-digestion property, so that the finally prepared liposome had the property of long-term circulating in the body, thereby improving bioavailability.

Compared the sample W1 with the reference sample DW6, the AUC(O-t) and AUC(0-∞) of the supercritical coenzyme Q10 nanoliposome was increased by 35.9% and 34.8%, respectively, indicating that the starch calcium octenyl succinate prepared by the supercritical fluid technology had stronger emulsifying property, which could make the finally prepared liposome have better stability, thereby improving bioavailability.

Compared the sample W1 with the reference sample DW7, the AUC(O-t) and AUC(0-∞) of the supercritical coenzyme Q10 nanoliposome was increased by 122% and 115.8%, respectively, indicating that compared with the conventional granulation technology, the liposomes prepared by the supercritical fluid granulation technology showed smaller particle size, so that they could be adhered and contacted in the gastrointestinal tract and quickly absorbed, exhibited increased in vivo exposure, thereby improving their absorbability and bioavailability.

Although specific embodiments of the present invention have been described in detail, those skilled in the art will understand that various modifications and substitutions of those details may be made within the scope of the present invention in light of all the teachings disclosed. The full scope of the invention is given by the appended claims and any equivalents thereof.

What is claimed is:
1. A method for preparing modified starch, comprising the steps of
   (1) in a supercritical carbon dioxide medium, starch is used as raw material, ethanol is used as an entrainer, and the reaction is carried out under supercritical $CO_2$ conditions to obtain a pretreated product;
   (2) separating and purifying the pretreated product of step (1);
   (3) reacting the pretreated product obtained in step (2) with a chemical modifier to prepare modified starch; and
   (4) separating and purifying the modified starch prepared in step (3).
2. The method for preparing modified starch according to claim 1, wherein the chemically modified starch is one or more selected from the group consisting of starch calcium octenyl succinate, starch aluminum octenyl succinate, starch barium octenyl succinate and starch iron octenyl succinate.

3. The method for preparing modified starch according to claim 1, wherein, in step (1), the starch is one or more selected from the group consisting of corn starch, tapioca starch and potato starch.

4. The method for preparing modified starch according to claim 1, wherein, in step (1), relative to the mass of starch, the amount of ethanol used is 10%-30%.

5. The method for preparing modified starch according to claim 4, wherein, in step (1), the reaction time is 0.5-2 h; and the supercritical $CO_2$ conditions are a pressure of 30-40 MPa and a temperature of 35° C.-50° °C.

6. The method for preparing modified starch according to claim 5, wherein,
in step (2), the product of step (1) is separated and purified by supercritical carbon dioxide extraction; the pressure is 30-50 MPa, the temperature is 40° C.-50° C., and the flow rate of $CO_2$ is 10-25 L/h.

7. The method for preparing modified starch according to claim 6, wherein, in step (3),
in a supercritical carbon dioxide medium, the product obtained in step (2) is used as a raw material and n-hexane is used as an entrainer, in the presence of a chemical modifier, a catalyst and an appropriate amount of water, and the modified starch is prepared by a supercritical fluid reaction.

8. The method for preparing modified starch according to claim 7, wherein,
in step (4), the product of step (3) is separated and purified by supercritical carbon dioxide extraction, wherein the pressure is 40-50 MPa, the temperature is 55° C.-65° C., and the flow rate of $CO_2$ is 15-25 L/h.

9. The method for preparing modified starch according to claim 1, wherein, in step (1), the reaction time is 0.5-2 h; and the supercritical $CO_2$ conditions are a pressure of 30-40 MPa and a temperature of 35° C.-50° C.

10. The method for preparing modified starch according to claim 1, wherein,
in step (2), the product of step (1) is separated and purified by supercritical carbon dioxide extraction; the pressure is 30-50 MPa, the temperature is 40° C.-50° C., and the flow rate of $CO_2$ is 10-25 L/h.

11. The method for preparing modified starch according to claim 1, wherein, in step (3),
in a supercritical carbon dioxide medium, the product obtained in step (2) is used as a raw material and n-hexane is used as an entrainer, in the presence of the chemical modifier, a catalyst and an appropriate amount of water, and the modified starch is prepared by a supercritical fluid reaction.

12. The method for preparing modified starch according to claim 11, wherein, in step (3),
the supercritical reaction conditions are a pressure of 30-45 MPa and a temperature of 50° C.-60° C.;
relative to the mass of the product of step (2), the amount of n-hexane used is 10%-25%;
the chemical modifier is at least one selected from the group consisting of octenyl succinic anhydride and acetic anhydride;
the catalyst is at least one selected from the group consisting of $Ca(OH)_2$, $Al(OH)_3$, $Ba(OH)_2$ and $Fe(OH)_3$;
relative to the mass of the product of step (2), the amount of water used is 10%-70%; and
the reaction time is 1-5 hours.

13. The method for preparing modified starch according to claim 1, wherein, in step (4), the product of step (3) is separated and purified by supercritical carbon dioxide extraction, wherein the pressure is 40-50 MPa, the temperature is 55° C.-65° C., and the flow rate of $CO_2$ is 15-25 L/h.

14. A modified starch, which is obtained by the method for preparing modified starch according to claim 1.

15. The modified starch according to claim 14, characterized by any one or more of the following items (1) to (3):
(1) the viscosity of the modified starch at 25° C. is less than 100 mPa's;
(2) when the modified starch emulsifies liquid paraffin, the time required for the emulsion to separate 10 mL of solution is greater than or equal to 1100 s;
(3) when 1g of the modified starch is placed in 100 ml of water (25° C.), it is wetted and completely dissolved or dispersed in water, and the time required to form a uniform emulsion system is less than 100 s.

* * * * *